United States Patent [19]

Esser

[11] 4,447,178
[45] May 8, 1984

[54] HORIZONTAL DRILLING AND MILLING MACHINE WITH A HEADSTOCK MOVING UP AND DOWN IN GUIDES

[75] Inventor: Karl-Josef Esser, Monchen-Gladbach, Fed. Rep. of Germany

[73] Assignee: Scharmann GmbH & Co., Monchen-Gladbach, Fed. Rep. of Germany

[21] Appl. No.: 352,332

[22] Filed: Feb. 25, 1982

[30] Foreign Application Priority Data

Mar. 10, 1981 [DE] Fed. Rep. of Germany ....... 3108934

[51] Int. Cl.³ .......................... B23B 47/26; B23C 1/02
[52] U.S. Cl. .......................................... 409/80; 408/3; 408/235; 409/237
[58] Field of Search ............... 409/237, 238, 239, 187, 409/80; 408/235, 3

[56] References Cited

U.S. PATENT DOCUMENTS

| | | | |
|---|---|---|---|
| 3,827,333 | 8/1974 | Hurd | 409/187 |
| 3,853,423 | 12/1974 | Quack | 409/237 X |
| 3,988,965 | 11/1976 | Cayen et al. | 409/235 X |
| 4,149,882 | 4/1979 | Lehmkuhl | 409/237 X |
| 4,178,834 | 12/1979 | Holmstrom | 409/239 |

FOREIGN PATENT DOCUMENTS

| | | |
|---|---|---|
| 1261730 | 2/1968 | Fed. Rep. of Germany . |
| 1602736 | 11/1970 | Fed. Rep. of Germany . |
| 2147985 | 3/1973 | Fed. Rep. of Germany . |
| 2742642 | 9/1979 | Fed. Rep. of Germany . |

Primary Examiner—Z. R. Bilinsky
Attorney, Agent, or Firm—Burns, Doane, Swecker & Mathis

[57] ABSTRACT

A horizontal drilling and milling machine comprises a vertically movable headstock and a spindle sleeve mounted for horizontal run-out from the headstock. Typically, an outer end of the spindle sleeve undergoes a vertical deflection relative to the headstock during run-out, which deflection is an exponential function of the extent of the run-out. A correcting means is connected to the headstock to move the latter as the run-out proceeds, to effect a vertical correction displacement of the forward end of the spindle sleeve, which displacement is the same exponential function of the extent of the run-out as that of the vertical deflection relative to the headstock. Correction is achieved by comparing a signal indicative of the extent of the run-out, with a predetermined exponential function for the particular spindle sleeve and tool, and generating a suitable correction signal in response thereto. A memory and computer device is employed to make the necessary comparison. The memory and computer device transmit a signal to a motor, which motor is arranged to displace a reversing roll around which a cable is extended. The ends of the cable are connected between the headstock and counterweight. Radial movement of the reversing roll causes the headstock to be inclined in a vertical plane. A motion transmitting mechanism between the motor and the reversing roll enables precise movements to be made even by a motor rotating at high rpm.

5 Claims, 3 Drawing Figures

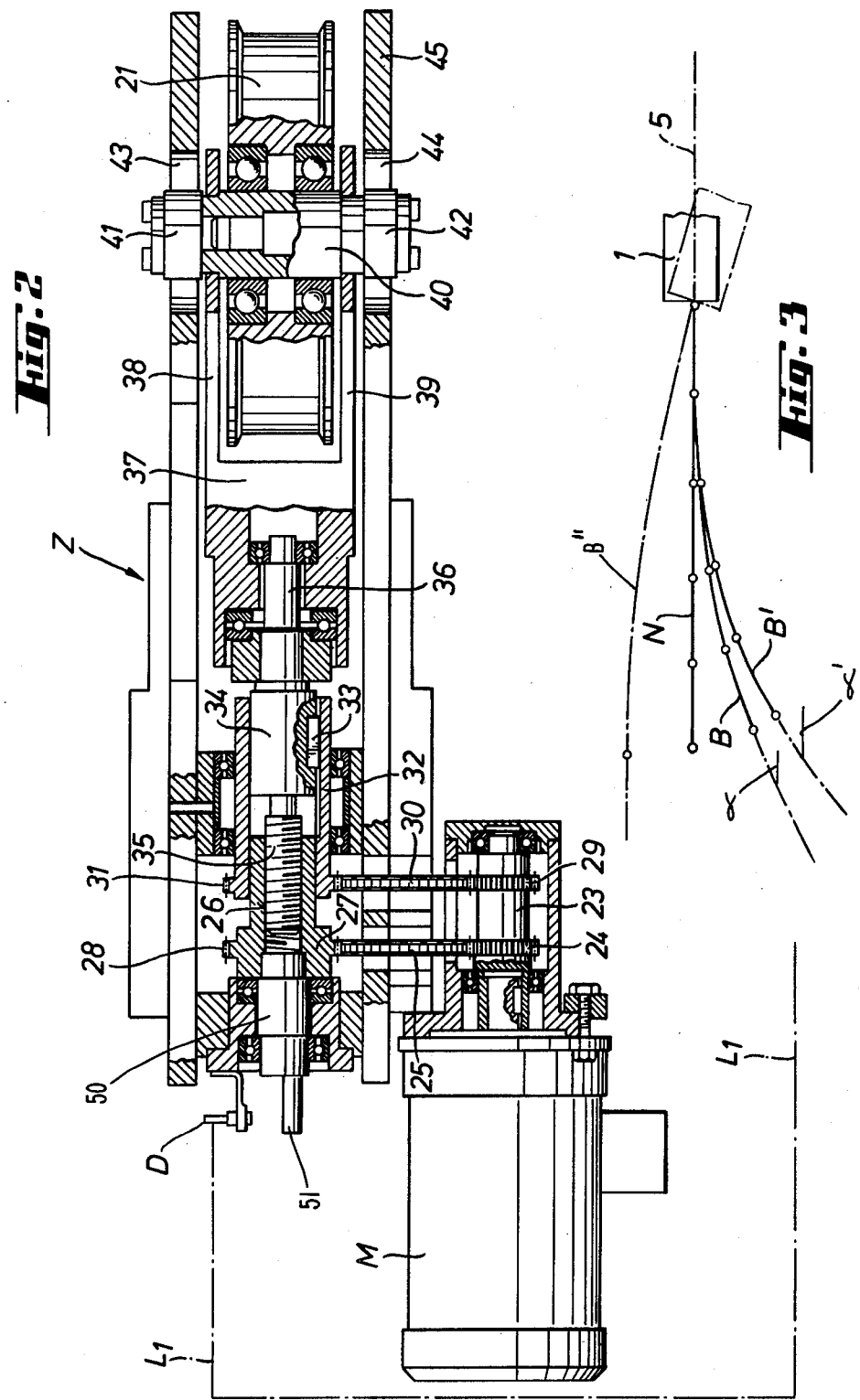

HORIZONTAL DRILLING AND MILLING MACHINE WITH A HEADSTOCK MOVING UP AND DOWN IN GUIDES

BACKGROUND AND OBJECTS OF THE INVENTION

The invention concerns a horizontal drilling and milling machine of the type comprising a vertically movable headstock which carries a horizontally adjustable spindle sleeve. A counterweight is connected to the headstock by a pair of vertical chains.

In apparatus of the type wherein a spindle sleeve is run-out or extended from a headstock, there is a tendency for the front end of the spindle to deflect downwardly relative to the headstock and travel along a non-linear path. The deflection is an exponential function of the extent of run-out of the spindle sleeve and may assume, for example the pattern B or B' shown in FIG. 3. That is, the front end of the tool-carrying spindle sleeve traces, during the run-out of the spindle sleeve, a dislocation line, which results, for example, from the deformation of the vertical guide elements due to the shifting of the center of gravity caused by the displacement of the spindle sleeve, and the weight of the tool at the front end of the spindle sleeve.

Attempts to counteract such deflections to minimize the extent to which the front end of the spindle sleeve deviates from a desired zero deviation line (e.g., line N in FIG. 3) have included by the provision of a counterweight system connected to the headstock by means of chains. As the spindle sleeve is run-out the counterweight system is adjusted to shift the headstock counter to the displacement of the spindle sleeve and thereby reduce the extent to which the path of travel of the spindle sleeve deviates from the desired travel path.

A horizontal drilling and milling machine of this type is known from German OS No. 21 47 985. Therein, the position of the center of gravity of the counterweight is varied by the shortening or lengthening of at least one of the connecting chains between the headstock and the counterweight in or approximately in the horizontal direction. In this known machine there exists a strict linearity between the longitudinal movement of the spindle sleeve on the headstock and the shortening or lengthening of the one chain between the headstock and the counterweight in that end of the front chain connected with the headstock, i.e., the chain facing the front side of the headstock, is adjusted by means of a mechanical transfer system of shafts and conical gear wheels directly by the drive shaft or spindle of the spindle sleeve.

From German AS No. 27 42 642 there is further known a device for the weight balancing of an instrument part movable on an X-ray apparatus, wherein the balancing of the camera, the amplifier and the target device, suspended on a common supporting cable, is effected by means of a prestressed system of springs or a servomotor, controlled by a device measuring the strain of the common support cable, for example a strain gage.

From German AS No. 1 261 730 a weight equalizing device, in particular for the headstock of a drilling and milling machine, is known, wherein the headstock is horizontally displaceable in a vertically guided slide, and is connected by means of a cable with a vertically displaceable counterweight. The counterweight is guided on two rolls, arranged on a supporting beam pivoting around a vertical axle on the upper end of the machine frame. In case of a horizontal movement of the headstock in the vertically guided slide, the supporting beam performs, with the aid of a gear, a pivoting motion, whereby the headstock is caused to effect with one end of the cable a horizontal movement in one direction and the counterweight with the second cable end a similar movement in the opposite direction, so that the resultant of the forces of the headstock and of the counterweight is always passing through the axis of the pivoting beam.

Finally, from German AS No. 1 602 736 there is known a counterweight suspension for drilling and milling machines having a run-out spindle sleeve. Equalization of the differential strain in two tension ropes loaded with a counterweight and connected with their ends adjacent to the headstock with the ends of a beam varies the annular position of the headstock with respect to the horizontal in a vertical plane. The headstock is supported by a roll to be displaced simultaneously with the spindle sleeve relative to the beam by means of an adjusting gear.

The above-mentioned state of the art includes only devices wherein there is effected a linear adjustment of the deflection range of the moving element, i.e., the camera, target device, or drilling spindle or the headstock. That is, some of but not all of the deflection is compensated for by the linear adjustment effected by the prior art.

It is therefore an object of the invention to minimize or obviate problems of the type discussed above.

Another object is to more precisely compensate for the deviations of a moving spindle sleeve.

A further object of the invention is to comply with the exponential line of displacement of the spindle sleeve and respectively with the curve described by the front end of the spindle sleeve and its tool during longitudinal movement of the spindle sleeve, and to equalize the deviation of this line or curve from the zero line in the extension of the axis of the spindle sleeve. This condition is to be satisfied even in the case of the spindle sleeve being provided with different tools. The mechanism used in the process should be simple in design and easily handled.

SUMMARY OF THE INVENTION

The objects are attained in a horizontal drilling and milling machine of the type comprising a vertically movable headstock, and a spindle sleeve mounted for horizontal run-out from the headstocks such that an outer end of the spindle sleeve undergoes a vertical deflection relative to the headstock, such deflection being an exponential function of the extent of the run-out. A correcting mechanism comprises a counterweight, a reversing roll, a cable traveling over the reversing roll to form first and second generally vertical cable sections connected, respectively, to the counterweight and headstock, and a mechanism for displacing the second cable section to move the headstock vertically in response to the run-out. In accordance with the present invention, the counterweight is constrained for vertical movement. The reversing roll is mounted for movement in a radial direction to move the second cable section in a manner displacing the headstock vertically. The correcting mechanism includes means for radially moving the reversing roll to vertically move the headstock in a manner effecting a vertical correction displacement of the forward end of the spindle sleeve, which displacement is the same exponential function of the extent of run-out as that of the deflection of the spindle sleeve relative to the headstock. In this manner, the front end of the spindle sleeve is maintained on a zero deflection path.

It is an advantage of the device according to the invention that the counterweight is held extensively without vibration in its guide, so that the center of gravity does not undergo lateral displacement. The deviation from the zero line, i.e., the deviation from the longitudinal axis of the spindle sleeve, which is a function of the weight of the tool to be used, is equalized rapidly and accurately. It is only necessary during the advance of the spindle sleeve to feed the advance values into the compensating device by means of a distance indicator, whereupon the compensating device directly issues the corresponding pulses to move the adjustable rolls. These pulses are fed to a rotation indicator and then to a rotating motor. A relatively high rpm motor may be used with an intermediate motion transmitting mechanism converting the high rpm rotating motion of the motor into a sensitive, small and accurate longitudinal adjustment of the axle of the adjustable reversing roll.

THE DRAWING

The drawing shows an example of a preferred embodiment of the invention, wherein:

FIG. 2 shows the motion transmitting mechanism in longitudinal section, and

FIG. 3 is a representation of the zero line, i.e., the horizontal center axis of the non-deflected spindle sleeve, and the exponential displacement lines along which the front end of the spindle sleeve (with different tools inserted) would be moving when run-out from the headstock in the absence of the present invention.

DETAILED DESCRIPTION OF A PREFERRED EMBODIMENT OF THE INVENTION

Figure 1:
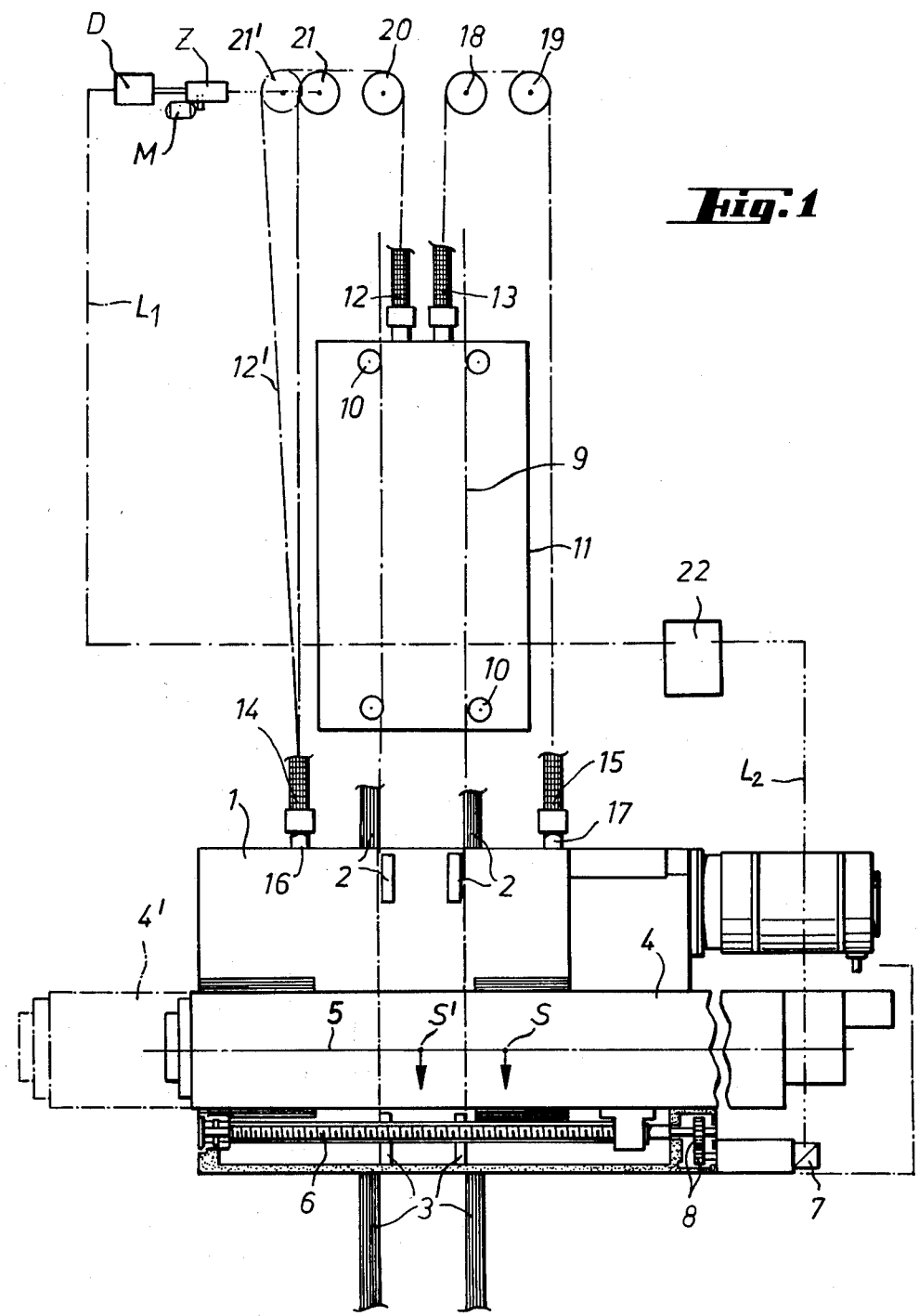
FIG. 1 shows the horizontal drilling and milling machine in side elevation.

In accordance with the present invention, a horizontal drilling and milling machine comprises a headstock 1 guided for vertical movement by means of guide elements 2 and 3. In the machine, the spindle sleeve 4, the longitudinal center axis whereof is designated by 5, may be run-out from a position indicated by a solid line in FIG. 1, for example into a position 4' (broken lines in FIG. 1). To adjust the spindle sleeve within the headstock 1, a suitable shaft or threaded spindle 6 may be employed. With the longitudinal displacement of the spindle sleeve 4 into its position 4', the position of the center of gravity S of the headstock with the spindle sleeve is also altered to the position S'.

The longitudinal motion of the spindle sleeve 4 is detected by the rod or spindle 6 or in any other manner and fed to a distance indicator 7 located at one end of the shaft 6. In the example, shown, for example, the distance indicator may be actuated by means of a gear assembly 8, to emit pulses corresponding to the prevailing longitudinal position of the spindle sleeve in a manner to be described in a detail hereinafter.

A counterweight 11 is guided for vertical movement on the guide 9, by means of guide elements 10. Cables, such as wire rope, metal chains, etc., interconnect the headstock with the counterweight. For example, front chain 12 and a rear chain 13 engage the counterweight. The front chain 12 has a second end 14 rigidly fastened at or in the vicinity of a front side of the headstock, as at 16. The rear chain 13 has a second end 15 rigidly fastened in the center of the vicinity of the rear side of the headstock 1 as at 17.

In place of the two chains 12, 13, a front and rear pair of chains may also be used. For the sake of simplicity, only a single front and rear chain will be discussed herein.

The rear chain 13 is guided around two reversing rolls 18, 19 arranged adjacently to each other in a horizontal plane, the locations of both rolls being fixed. The front chain, on the other hand, is passed around a fixed reversing roll 20 and a reversing roll 21 that is adjustable in a horizontal plane at the same height as the roll 20. The roll 21 may, for example, be displaced into the position 21', wherein the chain 12 would occupy the position 12'.

The reversing roll 21 is moved by means of an intermediate motion transmitting mechanism Z (see also FIG. 2) by a rotating motor M which operates at a high rpm. A rotation indicator D according to FIGS. 1 and 2 is connected to the motor and to a compensating device 22 via control line $L_1$. The device 22, in turn, is connected through a $L_2$ line to the distance indicator 7.

Heretofore in the art, when the spindle sleeve 4 is extended from the headstock, i.e., run-out, the front end of the spindle sleeve equipped with a tool does not travel along a zero line N (FIG. 3), but rather travels along a curve B relative to the headstock, depending upon (i) the elastic deformation of the vertical guide elements of the headstock, (ii) the structure of the spindle sleeve, and bearing support, (iii) the length of the run-out, and (iv) the weight of the tool mounted on the front end of the spindle sleeve. The deflection line thus may, in normal practice, assume the configuration B' in FIG. 3, or any other intermediate configuration (e.g., line B) between the zero line N and the displacement line B', for example upon a change of tools. As noted earlier, the deflection from zero line N is an exponential function of the extent of the run-out of the spindle sleeve.

In accordance with the present invention, compensation for this deflection is made more precisely than the linear connections heretofore made. By determining beforehand the deflection behavior of a particular spindle sleeve and tool, the exponential function for the spindle sleeve and tool can be stored into a conventional memory and computer device 22, such as a microprocessor. By supplying to the device 22 information concerning the extent of run-out of the spindle-sleeve, the device 22 can provide relatively precise output signals which represent the correction needed to maintain the front end of the spindle sleeve on the zero line N.

Therefore, the distance indicator 7 can be arranged to supply a progress signal to the compensating device 22 which, in turn, supplies a correction signal for regulating the counterweight system.

Thus, in the compensating device 22, the coordinates of the corresponding displacement lines B (or B') are stored and instantaneously matched with the prevailing position of the spindle sleeve indicated by the distance indicator 7. Continuous equalization is effected by means of the control lines $L_1$, $L_2$ and the compensating device 22 between the distance indicator 7, and the rotation indicator D, wherein the rotation of the motor is accelerated or retarded, so that the motion of the motor is rigorously controlled by the progress of the dislocation line B, with the reversing roll 21 being adjusted correspondingly in the horizontal direction.

The insertion of the values of the displacement lines B or B' in the compensating device 22 may be effected either on the basis of previously determined values, or else the spindle sleeve is displaced in an idle advance, absent the correcting action of the counterweight, and the displacement values are measured and fed into the device 22 in conjunction with the values of the signal transmitter 7. Thus, in a susequent advance of the spindle sleeve, pulses required for the compensation of the displacement line are transmitted from the compensation device 22 over the line $L_1$ to the rotation indicator D, thus making possible the corresponding actuation of the motor M.

In order to obtain accurate adjustments of the reversing roll 21 and to be able to use a relatively rapidly rotating motor M, a first chain wheel 24 is mounted fixedly on the drive shaft 23 of the motor M. The first chain wheel 24 drives, by means of a drive chain 25, a rotatable nut 27 by engaging its chain wheel part 28. The nut 27 is equipped with internal threading 26 and is secured against longitudinal displacement. A second chain wheel 29 is fixedly mounted on the drive shaft 23, and serves to rotate the serrated part 31 of a bushing 32 by means of a chain 30. In the bushing 32, a cylindrical guide part 34 is arranged by means of a groove and key 33, fixedly in rotation but displaceable longitudinally with respect to the bushing. The cylindrical guide part 34 carries a threaded spindle 35 engaging the internal threads 26 of the nut 27, so that upon rotation of the nut, the threaded spindle 35 and the cylindrical guide part 34 connected Connected with the nut 27 or with spindle 35 is a unthreaded short spindle 50 the free end of which has an eccentrical pin 51. At each full rotation of the short spindle 50 the rotation indicator generates an impulse which is given by the control line $L_1$ to the compensating device 22.

By moving the roll 21 in the position 21' in FIG. 1 the headstock 1 is inclined in a vertical plane e.g. in a position 1' in FIG. 3 in which the undotted lines B and B' show that the free end of the spindle sleeve of the uninclined headstock 1 confines angles $\alpha$ and $\alpha^1$ to the horizontal plane. By inclining the headstock the tool on the free end of the spindle sleeve works in a horizontal plane as shown at the end of the dotted line B" in FIG. 3.

Although the objects and advantages of the present invention have been described in connection with a preferred embodiment thereof, it will be appreciated by those skilled in the art, that additions, modifications, substitutions, and deletions not specifically described, may be made, without departing from spirit and scope of the invention as defined in the appended claims.

What is claimed is:

1. In a horizontal drilling and milling machine of the type comprising a vertically movable headstock, a spindle sleeve mounted for horizontal run-out from said headstock such that an outer end of said spindle sleeve undergoes a vertical deflection relative to said headstock, which deflection is an exponential function of the extent of said run-out, and correcting means comprising a counterweight at least two reversing rolls, two cables traveling over said reversing rolls to form first and second generally vertical cable sections connected, respectively, to said counterweight and said headstock, and means for displacing said first cable section to move said headstock in a vertical plane in response to said run-out, the improvement comprising:

means constraining said counterweight for vertical movement and preventing horizontal displacement thereof, means mounting the first of said reversing rolls for movement in a radial direction to move said first cable section in a manner displacing said headstock in a vertical plane, and said correcting means including:

sensing means for sensing the extent of horizontal run-out of said spindle sleeve and emitting run-out signals corresponding thereto;

a memory and computer apparatus for storing said exponential function, said memory and computer apparatus arranged to receive said run-out signals from said sensing means and emit deflection compensation signals which are an exponential function of the extent of horizontal run-out, and displacement means connected to said memory and computer apparatus and responsive to said deflection compensation signals for radially moving said first reversing roll to incline said headstock in a vertical plane about a horizontal axis in a manner effecting a vertical correction displacement of said outer end of said spindle sleeve, which displacement is an exponential function of the extent of said horizontal run-out so as to maintain said outer end of said spindle sleeve on a zero deflection path.

2. Apparatus according to claim 1, wherein said reversing roll is adjustable horizontally and in the same direction as the run-out of said spindle sleeve.

3. Apparatus according to claim 1, wherein said adjustable reversing roll comprises one of two reversing rolls over which said cable passes, and further including a pair of additional reversing rolls and an additional cable passing over said additional reversing rolls to form additional vertical cable sections connected to said counterweight and said headstock.

4. Apparatus according to claim 1, wherein said correcting means comprises a motor, motion transmitting means interconnecting an output shaft of said motor and said reversing roll for radially moving said reversing roll in response to rotation of said output shaft, and a rotation indicator connected to said compensating means and said motor for controlling the rotation of the motor in response to deflection compensation signals from said memory and computer apparatus.

5. Apparatus according to claim 1, wherein said motion transmitting means comprises an internally threaded nut, and a bushing aligned therewith, said nut and bushing arranged to rotate about a common axle, a spindle mounted within said bushing for rotation therewith and for longitudinal movement relative to said nut, said spindle having a threaded end threadedly connected within said nut, and means connecting said output shaft with said nut and bushing to rotate said nut and bushing in the same direction at different rotary speeds.

* * * * *